United States Patent
Hofmekler

(10) Patent No.: US 11,134,709 B2
(45) Date of Patent: Oct. 5, 2021

(54) SUGAR SUBSTITUTE COMPOSITIONS COMPRISING DIGESTION RESISTANT SOLUBLE FIBER

(71) Applicant: FlipN'Sweet, LLC, Tarzana, CA (US)

(72) Inventor: Ori Hofmekler, Tarzana, CA (US)

(73) Assignee: SWEETSCIENCE LLC, Tarzana, CA (US)

( * ) Notice: Subject to any disclaimer, the term of this patent is extended or adjusted under 35 U.S.C. 154(b) by 5 days.

(21) Appl. No.: 15/683,751

(22) Filed: Aug. 22, 2017

(65) Prior Publication Data

US 2018/0035701 A1 Feb. 8, 2018

Related U.S. Application Data

(63) Continuation of application No. 14/947,245, filed on Nov. 20, 2015, now abandoned.

(60) Provisional application No. 62/082,641, filed on Nov. 21, 2014.

(51) Int. Cl.
| | | |
|---|---|---|
| *A23L 27/12* | (2016.01) | |
| *A23L 27/00* | (2016.01) | |
| *A23L 27/30* | (2016.01) | |
| *A23L 33/21* | (2016.01) | |

(52) U.S. Cl.
CPC ............... *A23L 27/12* (2016.08); *A23L 27/30* (2016.08); *A23L 27/36* (2016.08); *A23L 27/84* (2016.08); *A23L 33/21* (2016.08)

(58) Field of Classification Search
None
See application file for complete search history.

(56) References Cited

U.S. PATENT DOCUMENTS

| | | | | |
|---|---|---|---|---|
| 6,461,659 | B1 * | 10/2002 | Zhou | A23L 27/33 |
| | | | | 426/103 |
| 7,229,658 | B1 * | 6/2007 | Inoue | A23C 9/1307 |
| | | | | 426/548 |
| 7,749,535 | B2 † | 7/2010 | Mower | |
| 8,367,137 | B2 | 2/2013 | Prakash et al. | |
| 8,816,067 | B2 * | 8/2014 | Naeye | A61K 31/733 |
| | | | | 536/123.12 |
| 2004/0254367 | A1 * | 12/2004 | Oku | C07H 3/06 |
| | | | | 536/123 |
| 2005/0074521 | A1 * | 4/2005 | Bartnick | A23G 1/0006 |
| | | | | 426/49 |
| 2005/0244543 | A1 † | 11/2005 | Takaichi | |
| 2007/0116823 | A1 * | 5/2007 | Prakash | A23L 2/60 |
| | | | | 426/548 |
| 2007/0116829 | A1 * | 5/2007 | Prakash | A61K 9/0056 |
| | | | | 426/548 |
| 2007/0116837 | A1 † | 5/2007 | Prakash | |
| 2007/0116840 | A1 † | 5/2007 | Prakash | |
| 2008/0226788 | A1 | 9/2008 | Chang et al. | |
| 2009/0162511 | A1 † | 6/2009 | Shi | |
| 2010/0119600 | A1 * | 5/2010 | Opheim | A61K 9/4858 |
| | | | | 424/456 |
| 2010/0267847 | A1 | 10/2010 | Yoshinaka et al. | |
| 2010/0284972 | A1 † | 11/2010 | Naeye | |
| 2011/0189348 | A1 * | 8/2011 | Inoue | A23C 11/10 |
| | | | | 426/72 |
| 2014/0099403 | A1 * | 4/2014 | Prakash | A23L 2/60 |
| | | | | 426/61 |
| 2014/0171519 | A1 * | 6/2014 | Prakash | C07H 15/24 |
| | | | | 514/777 |
| 2014/0199466 | A1 † | 7/2014 | Pohrte | |
| 2015/0098978 | A1 * | 4/2015 | Gao | A61K 9/2072 |
| | | | | 424/441 |
| 2015/0320823 | A1 | 11/2015 | Cho et al. | |
| 2016/0165941 | A1 | 6/2016 | Hofmekler | |

FOREIGN PATENT DOCUMENTS

WO WO 2018/229776 A1 12/2018

OTHER PUBLICATIONS

Eisner: EP 2025246 A1; published: Feb. 18, 2009. (Year: 2009).*
Takaichi: CA 2495400; published Sep. 20, 2011. (Year: 2011).*
GE: Gale Encyclopedia of Alternative Medicine, Copyright 2005 the Gale Group, Inc (Year: 2005).*
Dharmananda: Luo Han Guo: Sweet Fruit Used as Sugar Substitute and Medicinal Herb; published online by Jun. 24, 2004 at: http://web.archive.org/web/20040624081731/http://www.itmonline.org/arts/luohanguo.htm (Year: 2004).*
Stier: WO2006013416A1; published Feb. 9, 2006. (Year: 2006).*
SSG: Sugar and Sweet Guide: Glycemic Index; published at least by Jun. 30, 2014 at: https://web.archive.org/web/20140630100657/http://www.sugar-and-sweetener-guide.com/glycemic-index-for-sweeteners.html (Year: 2014).*

(Continued)

*Primary Examiner* — Patricia A George
(74) *Attorney, Agent, or Firm* — Pearl Cohen Zedek Latzer Baratz LLP

(57) ABSTRACT

What is provided are sugar substitute compositions comprising natural ingredients that provide added human health benefits and properties and characteristics of sugar, without the caloric content and glycemic index of sugar. Unlike artificial sweeteners, the sugar substitute compositions contain no chemicals or synthetic additives and taste and function like sugar. Specifically, the sugar substitute compositions comprise digestion resistant soluble fiber comprising an oligosaccharide matrix of glucose and/or fructose oligomers, which yield the sugar substitute digestion resistant property and allow it to simultaneously enhance the growth of beneficial bacteria in the human gut. In one particular embodiment, the sugar substitute comprises a digestion resistant soluble fiber, Luo Han Guo extract, and a flavor masking agent comprising *Oryza sativa* (rice) extract. In another embodiment, the sugar substitute comprises a digestion resistant soluble fiber, Luo Han Guo extract, a flavor masking agent comprising *Oryza sativa* (rice) extract, and a steviol glycoside.

18 Claims, No Drawings

(56) References Cited

OTHER PUBLICATIONS

Official Action dated Feb. 22, 2017 From the US Patent and Trademark Office Re. U.S. Appl. No. 14/047,245. (21 Pages).
International Search Report of PCT Application No. PCT/US2018/058161, dated Jan. 13, 2020.

\* cited by examiner
† cited by third party

SUGAR SUBSTITUTE COMPOSITIONS COMPRISING DIGESTION RESISTANT SOLUBLE FIBER

PRIORITY CLAIM

This patent application claims priority to and the benefit of the filing date of provisional patent application U.S. Ser. No. 62/082,641 filed on Nov. 21, 2014, which is incorporated herein in its entirety.

FIELD

This patent application relates to low calorie fiber-containing sugar substitute compositions that can be substituted directly for sugar in both consumer and industrial applications.

BACKGROUND

Sugar substitutes are natural and synthetic food additives that simulate the effect of sugar. Artificial sweeteners are synthetic sugar substitutes that may be derived from naturally occurring substances. Artificial sweeteners, such as Aspartame™, Sucralose™, and Saccharin™, are common alternatives to sugar because much less sweetener material is required as compared with the amount of sugar to achieve the same level of sweetness. Since many artificial sweeteners have higher levels of sweetness than sugar, they often have a different taste than that of sugar, frequently having a bitter or chemical aftertaste. In addition to not tasting like sugar, some sweeteners are made with glycemic or synthetic additives (such as maltodextrins) or sugar alcohols in an effort to more similarly resemble sugar. However, these artificial sweeteners still lack many of the properties and functions of sugar. Additionally, artificial sweeteners have been linked to an increase in diabetes, metabolic disease, neurotoxicity, carcinogenicity, and obesity as they have also been shown to adversely affect human gut bacteria. Artificial sweeteners have been specifically shown to increase the abundance of bacterial strains belonging to the *Bacteroides genus* and the Clostridiales order, both of which contain members linked to obesity, glucose intolerance, and opportunistic infections. In addition, artificial sweeteners are believed to interact with sweet taste receptors in the gut, which results in the release of insulin in the body. In addition to disrupting an individual's blood sugar levels, insulin spikes can also increase fat stores and general inflammation resulting in a variety of health issues, such as obesity and diabetes. As a result, high-volume artificial sweeteners are of particular concern to those individuals that already have elevated insulin or blood sugar levels. Thus, sugar substitutes derived from natural ingredients have been proposed as healthier alternatives to artificial sweeteners.

Sugar substitutes may be derived from plants, fruit, vegetables, herbs, roots, and grains. However, current sugar substitutes (some of which claim to be derived from natural sources), such as Isomalt™, Stevia™, Truvia™, and Monatin™, still lack many of the properties and functions of sugar. Some of these sugar substitutes only have between about 40% and 60% of the sweetness of sugar and have a notable metallic aftertaste, such as that of many Stevia™ extracts. Other natural sugar substitutes, such as Palatinose™, have a lower glycemic index than sugar, but provide the same amount of calories per gram as found in sugar. Some natural sugar substitutes, such as those containing sugar alcohol, cause laxative and bloating side effects and therefore are limited for use to only a small serving per day. Also, many natural sugar substitutes use ingredients derived from genetically modified organisms (GMO) and do not include a fiber component. Similarly, in the sugar substitutes that do utilize soluble fiber as a starting material, fiber production is often produced from GMO ingredients.

Up to now, commonly found natural sugar substitutes have used several ingredients, such as digestion resistant soluble fiber, Luo Han Guo extracts, and steviol glycosides, to replicate the various properties and characteristics of sugar. However, these attempts have not been successful in exactly replicating the properties and characteristics of sugar. As a result, these ingredients typically need to be combined with artificial ingredients, sugar alcohol, or maltodextrin in order to more accurately simulate sugar. Accordingly, there exists a need for a sugar substitute composition comprising natural ingredients that can provide the added human health benefits and properties and characteristics of sugar, without the caloric content and glycemic index of sugar and without causing adverse digestive side effects.

SUMMARY

What is provided are sugar substitute compositions comprising natural ingredients that provide added human health benefits and properties and characteristics of sugar, without the caloric content and glycemic index of sugar. Specifically, the compositions of matter, which comprise sugar substitutes, comprise digestion resistant soluble fiber derived from various starting materials. The sugar substitutes are nutritive, in that, they contribute nutrients to an individual's diet, but have fewer calories than sugar. As a result, the sugar substitutes may be used in any food, beverage, or nutritional product as a stand-alone product, without requiring the addition of sugar or a sweetener to add sweetness.

The digestion resistant soluble fiber material may be a mixture of short chain and medium chain glucose or fructose oligomers and may provide digestion and absorption resistant properties in an individual's gastrointestinal tract. In one particular embodiment, the sugar substitute comprises a digestion resistant soluble fiber, a natural fruit extract, such as Luo Han Guo (also known as luohanguo, monk fruit or Buddha fruit) extract, and a flavor masking agent comprising *Oryza sativa* (rice) extract. In another particular embodiment, the sugar substitute comprises a digestion resistant soluble fiber, a natural fruit extract, such as Luo Han Guo extract, a flavor masking agent comprising *Oryza sativa* (rice) extract, and a steviol glycoside.

Unlike artificial sweeteners, the sugar substitutes contain no chemicals or synthetic additives and taste and function like sugar. The digestive-resistant oligosaccharide matrix of glucose and/or fructose oligomers allow the sugar substitute to simultaneously enhance the growth of beneficial bacteria, such as bifidobacterium, in the human gut, while inhibiting the growth of harmful microorganisms. The digestion resistant soluble fiber material may be produced through an enzymatic process that does not involve yeast fermentation and its related by-products.

DETAILED DESCRIPTION

In the following detailed description, numerous specific details are set forth in order to provide a thorough understanding of the examples as defined in the claimed subject matter, and as an example of how to make and use the examples described herein. However, it will be understood by those skilled in the art that claimed subject matter is not intended to be limited to such specific details, and may even be practiced without requiring such specific details. In other instances, well-known methods, procedures, and ingredients have not been described in detail so as not to obscure the invention defined by the claimed subject matter.

Throughout this specification, the term process may, depending at least in part upon the particular context, be understood to include any method, process, apparatus, and/or other patentable subject matter that implements the subject matter disclosed herein.

What is provided are compositions of matter, which comprise sugar substitute products. According to one or more examples, the sugar substitute is comprised of a digestion resistant soluble fiber, a natural fruit extract, such as Luo Han Guo extract, and a flavor masking agent. In another particular embodiment, the sugar substitute is comprised of a digestion resistant soluble fiber, a natural fruit extract, such as Luo Han Guo extract, a flavor masking agent, and a steviol glycoside.

The digestion resistant soluble fiber may be derived from a variety of food sources, such as tapioca, corn, rice, oats, potatoes, yams, carrots, bananas, plantains, and pumpkins; or a variety of plant and root sources, such as chicory, Jerusalem artichoke, and cassava; or a variety of grains, such as wheat, oat, and barley, or a variety of legumes, such as beans, lentils, and peas; or a variety of grain-like starchy fruits, such as *quinoa* and buckwheat. The digestion resistant soluble fiber may be a mixture of short chain glucose or fructose oligomers that provide the product with digestion and absorption resistant properties in an individual's gastrointestinal tract.

The digestion resistant soluble fiber may be a glucose oligomer-based fiber that comprises an oligosaccharide matrix of glucose oligomers having α-D-(1,6)-linkage of various chain lengths, ranging from 2 to 9 saccharides linked together. The α-D-(1,6)-linkage allows the digestion resistant soluble fiber to have a digestion resistant property since the α-D-(1,6)-linkage is not digested or hydrolyzed by human intestinal enzymes, unlike an α-(1,4)-glycosidic bond, which is readily digested. Typically, the higher the level of branching, the better the compound resists digestion by human enzymes. In some examples, the oligomers that have greater than 8 saccharides in the fiber matrix may not have 100% α(1,6) linkages, but may instead be a mixture of α(1,6) and α(1,4) linkages. However, at least about 50% of the glucosyl moieties in the digestion resistant soluble fiber are linked by α(1,6) linkages. The digestion resistant soluble fiber may be a fructose oligomer-based fiber may have at least about 90% of the fructosyl moieties linked by β(2,1) linkages. Similarly to the α-D-(1,6)-linkage, the β(2,1) linkages allow the digestion resistant soluble fiber to have a digestion resistant property to limit digestion by human intestinal enzymes.

Other digestion resistant soluble fibers comprising either glucose or fructose oligomers, such as inulin, soluble corn (gluco) fiber, isomaltooligosaccharide (IMO), and fructooligosaccharides, are possible within the scope and spirit of this application. Inulin is a naturally occurring oligosaccharide belonging to a class of carbohydrates known as fructans. Typically, inulin is comprised of fructose units joined by β(2,1) linkages with chain-terminating glucose units. Due to the β(2,1) linkages, inulin is not digested by enzymes in the human gastrointestinal tract. As a result, inulin has reduced caloric value, dietary fiber, and prebiotic effects. Soluble corn (gluco) fiber (commercially available under PROMITOR® Soluble Fibre by Tate & Lyle) is commonly used to replace sugar, decrease caloric content, and add fiber in applications where a low viscosity glucose syrup is used. In addition, its high stability helps ensure that the fiber content remains constant over the product's shelf life.

The Luo Han Guo extract is derived from the *Siraitia grosvenorii* plant and is used to add flavor and increase the sweetness of the sugar substitute product, without having a chemical aftertaste or adding many additional calories. The Luo Han Guo extract may be used in powdered or liquid extract form and may comprise between about 40% and 99% mogrosides in a powdered form.

The steviol glycoside comprises a particular purity and may be derived from a steviol glycoside extract. The remainder of the steviol glycoside extract may comprise a mixture of other steviol glycosides. In some examples, the steviol glycoside may be Rebaudioside A (also known as Reb A), Rebaudioside B, Rebaudioside C, Rebaudioside D, Rebaudioside E, Rebaudioside X, any other Rebaudioside, Dulcoside A, stevioside, or other functionally and structurally equivalent stevia extracts, including extracts of the Stevia leaf as a whole, or combinations thereof. The steviol glycoside may be used in a powdered or liquid extract form to increase the sweetness of the sugar substitute product, without adding any additional calories to the product. The steviol glycoside compositions may have different purities. In one example, the purity of Rebaudioside may range from about 60% to about 99% by weight on a dry basis. Rebaudioside A is about 200 times sweeter than sugar and contains only glucose molecules.

The flavor masking agent may comprise vanilla extract, *Oryza sativa* (rice) extract, and/or ethyl alcohol. In some embodiments, the *Oryza sativa* (rice) extract may be *Oryza sativa* (rice) bran. In most examples, the amount of ethyl alcohol is mostly evaporated from the sugar substitute product. The flavor masking agent may be used to balance and optimize the flavors of the sweeteners in the composition to resemble that of sugar. The ingredients and formulations of the flavor masking agent vary depending on the type of sugar substitute. In some examples, a greater amount *Oryza sativa* (rice) extract is used for plain sugar substitutes, as opposed to vanilla sugar substitutes, which comprise a natural vanilla flavored agent.

One or more sugar substitute examples are vanilla sugar substitutes. Vanilla sugar substitutes are organic and non-organic and include a digestion resistant soluble fiber derived from natural sources, Luo Han Guo extract, a flavor masking agent, a steviol glycoside, and a natural vanilla flavored agent. The digestion resistant soluble fiber in this particular example is a mixture of short chain glucose oligomers that provide the sugar substitute with digestion and absorption resistant properties in a human's gastrointestinal tract. The digestion resistant soluble fiber comprises an oligosaccharide matrix of glucose oligomers with a mixture of α(1,6) and α(1,4) linkages of various chain lengths, ranging from 2 to 9 saccharides linked together. The α-D-(1,6)-linkage allows the fiber to have a digestion resistant property since the α-D-(1,6)-linkage is not digested or hydrolyzed by human intestinal enzymes, unlike an α-(1,4)-glycosidic bond, which is readily digested. The sugar substitute in this particular example includes a digestion resistant soluble fiber derived from tapioca.

The Luo Han Guo extract in this particular example is derived from the *Siraitia grosvenorii* plant and is used to add flavor and increase the sweetness of the sugar substitute product, without having a bitter aftertaste or adding many additional calories. The Luo Han Guo may be used in a powdered or liquid extract form and comprises between about 40% and 99% mogrosides, a group of terpene glycosides, in a powdered form. Other Luo Han Guo extracts having potencies from about 10% to about 40% mogrosides in powdered form are possible within the scope and spirit of this application.

The steviol glycoside in this particular example is Rebaudioside A. The Rebaudioside A is used in powdered or liquid extract form to increase the sweetness of the sugar substitute without adding any additional calories to the sugar substitute. The Rebaudioside A has a purity that may range from about 60% to about 99% by weight on a dry basis. Other steviol glycoside examples having a purity that may range from about 40% to about 60% are possible within the scope and spirit of this application.

The flavor masking agent in this particular example comprises vanilla extract and *Oryza sativa* (rice) extract. The flavor masking agent is used to suppress the bitterness of the sweeteners in the composition. Other flavor masking agents are possible within the scope and spirit of this application.

The natural vanilla flavored agent in this particular example may include natural flavoring and maltodextrin. The natural vanilla flavored agent may be derived from a pre-made vanilla flavored powder or from freshly-grounded Vanilla Beans. The natural vanilla flavored agent adds flavor to the sugar substitute product and masks potential aftertastes. Other flavor masking agents, such as natural maple, cane, malt, malted milk, caramel, cream, honey flavoring, natural coffee, cocoa, rice, coconut, and almond extracts are possible within the scope and spirit of this application.

According to one example, the vanilla sugar substitute composition comprises:

| Ingredient | % by Weight | Range % by Weight |
|---|---|---|
| Tapioca-Derived Digestion Resistant Soluble Fiber | 96.7 | 90-98.5 |
| Natural Vanilla Flavored Agent | 2.5 | 0.1-6.0 |
| Flavor Masking Agent | 0.5 | 0.1-7.0 |
| Rebaudioside A | 0.06 | 0.01-0.8 |
| Luo Han Guo Extract | 0.24 | 0.01-2.59 |

One or more sugar substitute examples are plain sugar substitutes. In one embodiment, a plain sugar substitute includes a digestion resistant soluble fiber, Luo Han Guo extract, and a flavor masking agent. In another embodiment, a plain sugar substitute includes a digestion resistant soluble fiber, Luo Han Guo extract, a flavor masking agent, and a steviol glycoside. The digestion resistant soluble fiber is a mixture of short chain glucose oligomers that provides the product with digestion and absorption resistant properties in an individual's upper GI tract. The digestion resistant soluble fiber comprises an oligosaccharide matrix of glucose oligomers with a mixture of $\alpha(1,6)$ and $\alpha(1,4)$ linkages of various chain lengths, ranging from 2 to 9 saccharides linked together. The $\alpha$-D-(1,6)-linkage allows the digestion resistant fiber to have a digestion resistant property since the $\alpha$-D-(1,6)-linkage is not digested or hydrolyzed by human intestinal enzymes, unlike an $\alpha$-(1,4)-glycosidic bond, which is readily digested. The sugar substitute in this particular example includes a digestion resistant soluble fiber derived from tapioca.

Other digestion resistant soluble fibers comprising either glucose or fructose oligomers, such as inulin, (IMO), and soluble corn (gluco) fiber, are possible within the scope and spirit of this application. In some embodiments, the inulin is extracted from various root sources, such as Chicory and Jerusalem artichoke, and is a heterogeneous collection of fructose polymers, linked by $\beta(2,1)$ linkages. The inulin may be comprised of fructose units joined by $\beta(2,1)$ linkages with chain-terminating glucose units. In addition, the inulin may be composed of oligomers having degrees of polymerization between about 2 and 60. The soluble corn (gluco) fiber (commercially available under PROMITOR® Soluble Fibre by Tate & Lyle) is commonly used to replace sugar, decrease caloric content, and add fiber in applications where a low viscosity glucose syrup is used.

The Luo Han Guo extract in this particular example is derived from the *Siraitia grosvenorii* plant and is used to add flavor and increase the sweetness of the sugar substitute product, without having a chemical aftertaste or adding many additional calories. The Luo Han Guo may be used in powdered or liquid extract form and comprises between about 40% and 99% mogrosides in a powdered form. Other Luo Han Guo extracts having potencies with less than 40% mogrosides in a powdered form are possible within the scope and spirit of this application.

The steviol glycoside in this particular example is Rebaudioside A. The Rebaudioside A is used in powdered or liquid extract form to increase the sweetness of the sugar substitute without adding additional calories to the sugar substitute. The Rebaudioside A has a purity that may range from about 60% to about 99% by weight on a dry basis. Other steviol glycoside examples having a purity that may range from about 40% to about 60% are possible within the scope and spirit of this application.

The flavor masking agent in this particular example comprises vanilla extract, *Oryza sativa* (rice) extract, and/or ethyl alcohol. In some embodiments, the *Oryza sativa* (rice) extract may be *Oryza sativa* (rice) bran. In most examples, the amount of ethyl alcohol is mostly evaporated from the sugar substitute product. The flavor masking agent may be used to balance and optimize the flavors of the sweeteners in the composition to resemble that of sugar. Other flavor masking agents are possible within the scope and spirit of this application.

According to one example, the plain sugar substitute composition comprises:

| Ingredient | % by Weight | Range % by Weight |
|---|---|---|
| Tapioca-Derived Digestion Resistant Soluble Fiber | 99.2 | 90-99.5 |
| Flavor Masking Agent | 0.5 | 0.1-5.0 |
| Rebaudioside A | 0.06 | 0.01-1.0 |
| Luo Han Guo Extract | 0.24 | 0.01-2.5 |

The plain sugar substitute example may include both organic and non-organic versions. The organic and non-organic versions have different ingredients. The organic version is made with all organic ingredients, while the non-organic version is made with non-organic ingredients and may contain some organic ingredients. The different ingredients between the organic and non-organic versions results in differences in labeling properties between the two versions. Most sweeteners and sugar substitutes contain genetically modified ingredients and are only available in non-organic forms.

The sugar substitute compositions described herein have about 65% to about 100% of the sweetness of dextrose, as opposed to sugar substitute compositions generated using yeast fermentation that only have about 30% to 60% of the sweetness of dextrose. The mixture of oligosaccharides in the digestion resistant soluble fiber may be spray dried into a sold form, such as a powder, chuck, pellet, block, granules, or the like. The enzymatic processing may control the degree of polymerization of the digestion resistant soluble fiber and the formation of $\alpha(1,6)$ and/or $\beta(2,1)$ linkages to allow for consistent high quality digestion resistant soluble fiber production from alternative sources.

The digestion resistant soluble fiber may be blended with natural flavoring ingredients, which may include the Luo Han Guo extract, the flavor masking agent, the steviol glycoside, and the natural vanilla flavored agent to generate a sugar substitute powder having from about 65% to about 15,000% of the sweetness of dextrose. The sugar substitute may be granulated to yield sugar-like granules having a mesh size between about 5 and 60 microns. Nutritional additives, such as probiotics, turmeric, ginger, banana, blueberry, strawberry, acai, papaya, mango, pineapple, apple, cinnamon, pepper, nut, seed, vanilla, coffee, cacao, or green tea extracts can be added to the sugar substitute, in either the powder, granule, or liquid form, to produce a functional sugar substitute composition having additional nutritive properties and functions of sugar.

In an exemplary embodiment, the sugar substitute powder is mixed with turmeric, having from about 0.1% to about 1% of the total mixture, to produce sugar-like granules, which have additional anti-inflammatory and antioxidant properties. In another exemplary embodiment, the sugar substitute powder is mixed with ginger powder to produce ginger sugar-like granules having additional digestive aid properties. The ginger sugar-like granules may be used for a variety of food and beverage applications, such as ginger tea or ginger-sugar substitute for candy or baking applications. In yet another exemplary embodiment, the sugar substitute powder or granules are mixed with a strain of probiotics (such as bifidobacterium) to yield a symbiotic product with potent health protective properties attributed to those of the microbiota and the digestive resistant fiber.

The sugar substitutes generated herein have highly similar properties and functions to sugar. For example, the sugar substitutes may have from about 65% to about 100% of the sweetness level (dextrose equivalent) of sugar without a bitter aftertaste, as opposed to other sugar substitutes, which typically have a much higher percentage of the sweetness level of sugar and have a bitter aftertaste. Specifically, the plain sugar substitutes may have a cane sugar-like taste and texture in a solid form and honey-like or maple-like taste and texture in a liquid form.

The sugar substitutes described herein may function as a prebiotic by selectively stimulating growth of beneficial human gut bacteria, such as bifidobacterium. The bifidobacterium is a gut bacteria genus reported to have anti-inflammatory LPS inhibiting properties. Due to the oligosaccharide matrix structure of the sugar substitutes, the sugar substitutes are only partially fermented by colon bacteria, leaving an un-hydrolyzed and unabsorbed portion of the sugar substitutes to stimulate the growth of beneficial bifidobacterium subpopulations in the colon. One or more examples of the sugar substitutes herein may include a digestion resistant soluble fiber, so as to be classified as a dietary fiber by the American Association of Cereal Chemists.

Upon ingestion, the sugar substitutes described herein may yield short chain fatty acid metabolites, such as acetate, propolonate, and butyrate, which act to lower the intraluminal pH and thus inhibit the growth and activities of harmful microorganisms in the gut. The short chain fatty acids may also stimulate the growth of beneficial gut bacteria, which compete with gut pathogens for nutrients and epithelial adhesion sites.

The sugar substitutes may lower the glycemic index of certain foods and beverages, as the glycemic index of the sugar substitutes range from about 4 GI to about 35 GI, as compared with 100 GI for sugar. As a result, the sugar substitutes described herein may provide several physical health and safety benefits to adults, children, and infants. For example, the sugar substitutes may support individual dental health by reducing the risk of plaque formation and the amount of enamel attacking acids formed, by providing ingredients that limit cavity formation. In addition, the sugar substitutes may reduce the risk of diabetes, metabolic disease, neurotoxicity, carcinogenicity, and obesity in humans. An individual's bowel movement and microbial fermentation may be improved with the use of the sugar substitute product, without known adverse effects.

The sugar substitutes described herein are provided in various liquid forms, such as syrup, solution, or the like, and various solid forms, such as powder, chuck, pellet, block, granules, cubes, or the like. These sugar substitutes may be used to fully replace sugar in nearly any food, beverage, or nutritional product used in either consumer or industrial applications. In some embodiments, the sugar substitute is known as FLIPN'SWEET™.

It will, of course, be understood that, although particular examples have just been described, the claimed subject matter is not limited in scope to a particular example or implementation. Likewise, an example may be implemented in any combination of compositions of matter, apparatuses, methods or products made by a process, for example.

In the preceding description, various aspects of claimed subject matter have been described. For purposes of explanation, specific numbers, percentages, components, ingredients and/or configurations were set forth to provide a thorough understanding of claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features and examples have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A low calorie sugar substitute baking/confection composition comprising:
   a digestion resistant soluble fiber having glucosyl moieties and/or fructosyl moieties, and present in an amount of about 90% to 99.5% by weight of the composition;
   a flavor masking agent comprising a rice bran extract; a vanilla extract; and a Luo Han Guo extract, wherein the Luo Han Guo extract comprises between 40% and 99% mogrosides, and the flavor masking agent is present in an amount of about 0.1% to 7% by weight of the composition; and
   at least one fruit extract.

2. The low calorie sugar substitute baking/confection composition of claim 1, wherein the digestion resistant soluble fiber is selected from the group consisting of isomaltooligosaccharide (IMO), soluble corn fiber, inulin, and combinations thereof.

3. The low calorie sugar substitute baking/confection composition of claim 1, wherein the digestion resistant soluble fiber is derived from a food source selected from the group consisting of tapioca, corn, rice, oats, potatoes, yams, carrots, bananas, plantains, pumpkins, chicory, Jerusalem artichoke, cassava, wheat, barley, beans, lentils, peas, *quinoa*, buckwheat, or combinations thereof.

4. The low calorie sugar substitute baking/confection composition of claim 1, wherein the composition has a glycemic index of about 4 to about 35.

5. The low calorie sugar substitute baking/confection composition of claim 1, wherein the flavor masking agent is present in an amount of about 0.1% to 5% by weight for the composition.

6. The low calorie sugar substitute baking/confection composition of claim 1, wherein the flavor masking agent is present in an amount of about 0.1% to 0.5% by weight for the composition.

7. The low calorie sugar substitute baking/confection composition of claim 1, wherein the fruit extract is present in an amount of about 0.1% to 6% by weight for the composition.

8. The low calorie sugar substitute baking/confection composition of claim 1, wherein the fruit extract is present in an amount of about 2.5% by weight for the composition.

9. The composition of claim 1 further comprising a steviol glycoside.

10. A method of making a food product, comprising:
adding a low calorie sugar substitute baking/confection composition comprising:
a digestion resistant soluble fiber having glucosyl moieties and/or fructosyl moieties, and present in an amount of about 90% to 99.5% by weight of the composition;
a flavor masking agent comprising a rice bran extract; a vanilla extract;
and a Luo Han Guo extract, wherein the Luo Han Guo extract comprises between 40% and 99% mogrosides, and the flavor masking agent is present in an amount of about 0.1% to 7% by weight of the composition; and
at least one fruit extract,
to another food ingredient.

11. The method of claim 10, wherein the digestion resistant soluble fiber is selected from the group consisting of isomaltooligosaccharide (IMO), soluble corn fiber, inulin, and combinations thereof.

12. The method of making a food product according to claim 10, wherein the digestion resistant soluble fiber is derived from a food source selected from the group consisting of tapioca, corn, rice, oats, potatoes, yams, carrots, bananas, plantains, pumpkins, chicory, Jerusalem artichoke, cassava, wheat, barley, beans, lentils, peas, *quinoa*, buckwheat, or combinations thereof.

13. The method of making a food product according to claim 10, wherein the composition has a glycemic index of about 4 to about 35.

14. The method of making a food product according to claim 10, wherein the flavor masking agent is present in an amount of about 0.1% to 5% by weight for the composition.

15. The method of making a food product according to claim 10, wherein the flavor masking agent is present in an amount of about 0.1% to 0.5% by weight for the composition.

16. The method of making a food product according to claim 10, wherein the fruit extract is present in an amount of about 0.1% to 6% by weight for the composition.

17. The method making a food product according to of claim 10, wherein the fruit extract is present in an amount of about 2.5% by weight for the composition.

18. The method of making a food product according to claim 10, wherein the food product is a syrup, solution, powder, pellet, granule, or cube.

* * * * *